Dec. 23, 1952     R. W. KEELER     2,622,894
WHEEL TILTING MECHANISM

Original Filed Dec. 7, 1948     3 Sheets—Sheet 1

INVENTOR.
RAYMOND W. KEELER
BY
HIS ATTORNEY

Dec. 23, 1952   R. W. KEELER   2,622,894
WHEEL TILTING MECHANISM

Original Filed Dec. 7, 1948   3 Sheets-Sheet 2

INVENTOR.
RAYMOND W. KEELER
BY
HIS ATTORNEY

Dec. 23, 1952 R. W. KEELER 2,622,894
WHEEL TILTING MECHANISM
Original Filed Dec. 7, 1948 3 Sheets-Sheet 3

INVENTOR.
RAYMOND W. KEELER
BY
HIS ATTORNEY

Patented Dec. 23, 1952

2,622,894

UNITED STATES PATENT OFFICE 2,622,894

WHEEL TILTING MECHANISM

Raymond W. Keeler, Marion, Ohio, assignor to The Huber Manufacturing Company, Marion, Ohio, a corporation of Ohio Original application December 7, 1948, Serial No. 63,930. Divided and this application September 5, 1950, Serial No. 183,228

1 Claim. (Cl. 280—95)

This invention relates to wheel tilting mechanisms, and more particularly to a mechanism for tilting the steering wheels of a road grader, or the like, and is a division of my application, Serial No. 63,930, filed December 7, 1948.

In operating a road grader, or other self propelled wheel supported mechanisms, it is often desirable to tilt the steering wheels from their normal vertical positions to provide more adequate support for the frame and the parts carried thereby, and to better resist the lateral thrust thereon.

One object of the invention is to provide a simple, efficient and durable mechanism for tilting the wheels from their normal vertical positions and for returning the same to said normal positions.

A further object of the invention is to provide such a mechanism which will maintain the wheels in true parallelism one with the other in all positions thereof.

A further object of the invention is to provide such a mechanism in which the wheels are tilted to the desired inclination and retained at that inclination by power operated mechanisms.

Other objects of the invention may appear as the mechanism is described in detail.

Figure 1:
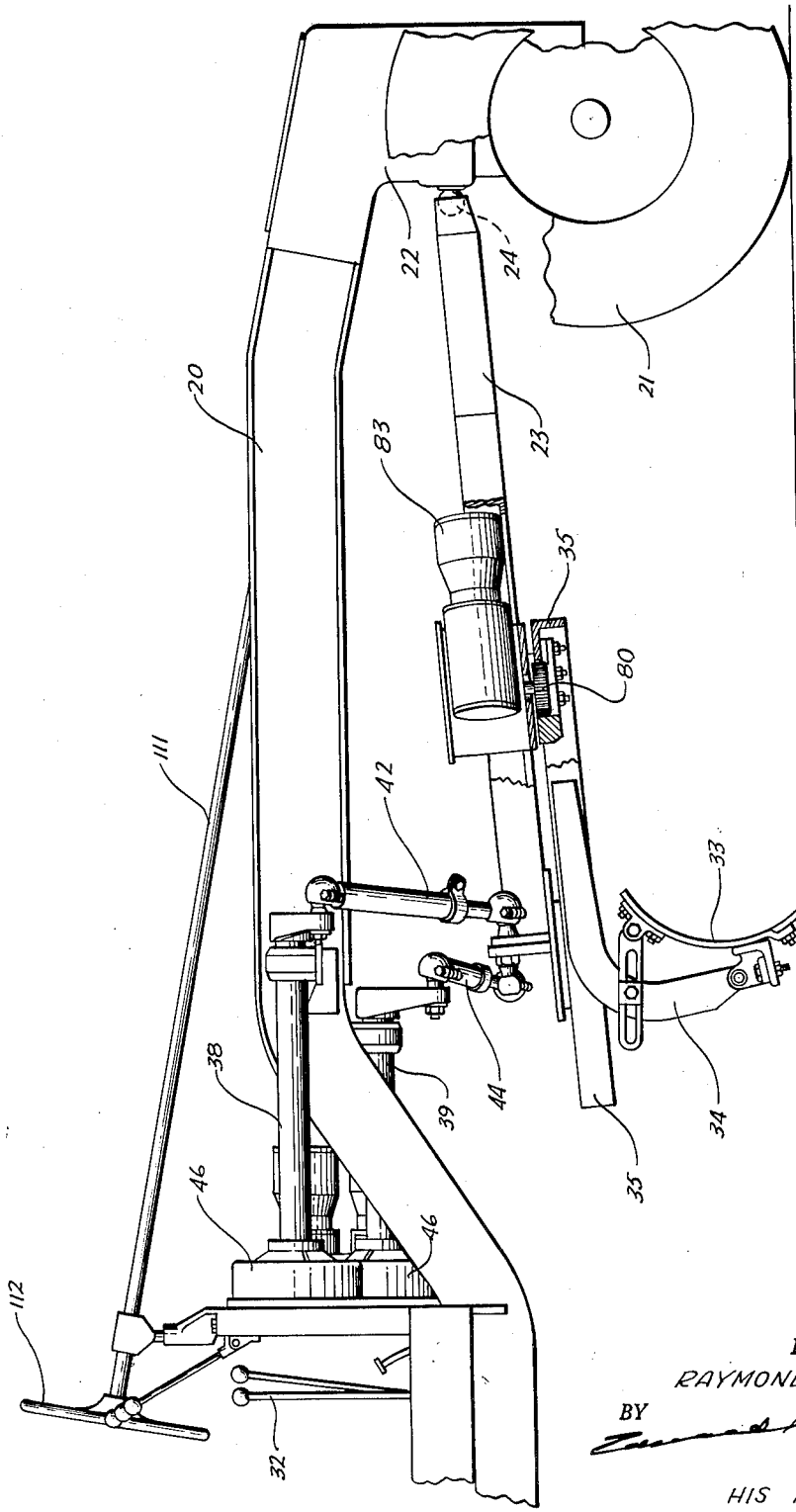
Figures 2, 3:
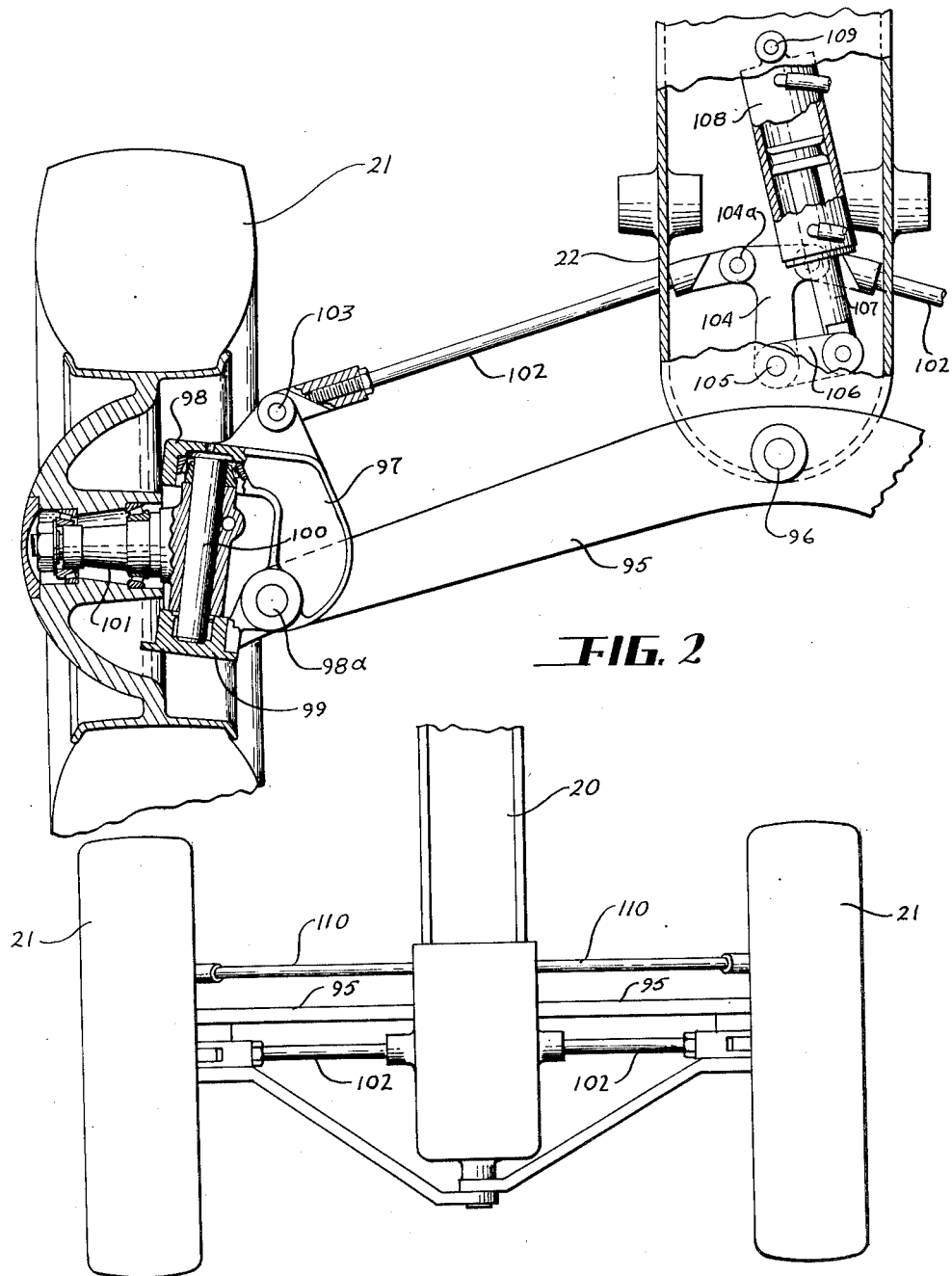

In the accompanying drawings, Fig. 1 is a side elevation, partly broken away, of the forward portion of a road grader provided with the wheel tilting mechanism; Fig. 2 is a front elevation, partly in section, of a portion of the front axle of a road grader and means for tilting the steering wheels thereof; Fig. 3 is a top plan view of the front axle and the steering wheels; Figs. 4, 5, 6, and 7 are front elevations of the front axle and the steering wheels, showing the same in different operative positions.

In these drawings I have illustrated one embodiment of the invention and have shown the same as applied to a road grader, but it is to be understood that the apparatus as a whole, as well as the several parts thereof, may take various forms and may be installed on wheel supported mechanisms of various kinds.

The road grader in connection with which the invention is here illustrated is of a known construction and I have shown only those parts thereof which may be helpful to an understanding of the construction and operation of the wheel tilting mechanism. The grader comprises a longitudinal frame 20 having at its forward end a downwardly extending part 22 with which the steering wheels 21 are connected. The rear portion of the frame, not shown, is supported on traction wheels and carries the power plant. A draw bar 23 is pivotally connected with the downwardly extending part 22 of the frame, usually by a universal joint 24, extends rearwardly therefrom and carries the road working implement, or implements. In the present instance the road working implement is a scraper blade 33 which extends transversely to the main frame and is supported by arms 34 which are rigidly secured to an internal gear 35, which is in mesh with a pinion 89 operated by a motor 83 to move the internal gear about a substantially vertical axis and thus move the scraper blade to different angular positions with relation to the main frame. The rear end of the draw bar is supported by links, one of which is shown at 42 as connected to a shaft 38, driven by a motor 46 to tilt the draw bar about its longitudinal axis. The rear portion of the frame is also connected by a link 44 with a shaft 39 which is driven by a motor 46 for the purpose of moving the draw bar about a vertical axis.

The steering wheels 21 are supported at the respective ends of an axle 95 which is pivotally mounted, substantially midway between the ends thereof, on the lower end portion of the downwardly extending part 22 of the main frame, for movement about an axis 96 extending lengthwise of the main frame, the end portions of the axle on the respective sides of the axis 96 sloping downwardly and outwardly. Wheel supporting members, or hangers, 97, are pivotally mounted on the respective end portions of the axle on axes parallel with the pivotal axis of the axle, as shown at 98a, and extend upwardly from their pivotal connections with the axle. In the present construction each hanger is provided with outwardly extending parts 98 and 99 in which there is rotatably mounted an upright member or king pin 100 to which is rigidly secured the spindle 101 on which the corresponding wheel 21 is mounted. The wheels are moved about the axes on the members 100 to steer the vehicle, by conventional steering mechanism, including rods 110 connecting the respective wheels with a steering rod 111 which extends rearwardly to the operator's station and is provided with an operating wheel 112. The hangers 97 are connected with an operating device on the main frame by which they may be moved simultaneously and in the same direction about their respective pivotal axes. For this purpose rigid members, such as rods 102, are pivotally connected at their outer ends with the upper portions of the wheel supporting members 97, as shown at 103. Each rod extends inwardly from the corresponding wheel supporting member and is secured at its inner end to the upper portion of a member, such as a crank arm 104, which is pivotally mounted in the lower portion of the part 22 of the main frame on an axis above and parallel with the pivotal axis of the axle and extends upwardly between the side members of said part of the frame. As here shown the crank arm 104 is rigidly secured to a shaft 105 mounted in the part 22 of the frame. The two rods 102 are pivotally connected with the crank arm 104, preferably on separate axes 104a, and the height of the pivotal connections above the pivotal axis of the axle is such that, when the wheels are in their vertical positions, the rods 102 are substantially parallel with the respective sloping ends of the axle.

Figure 4:
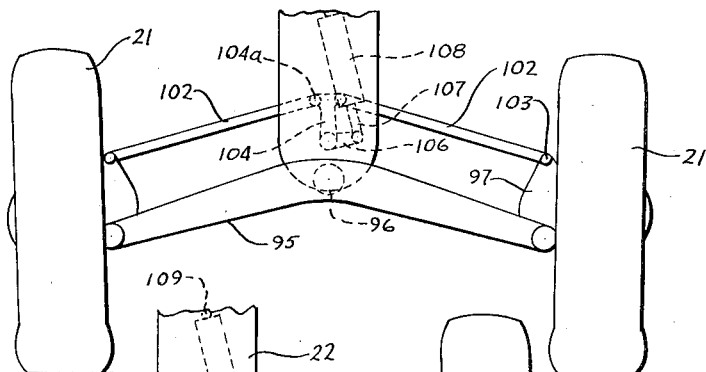
Figure 5:
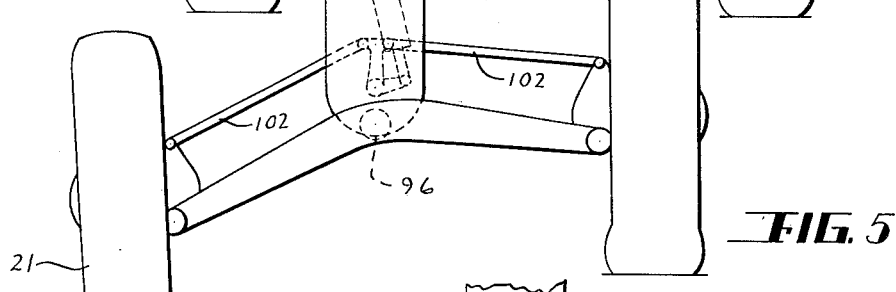
Figure 6:
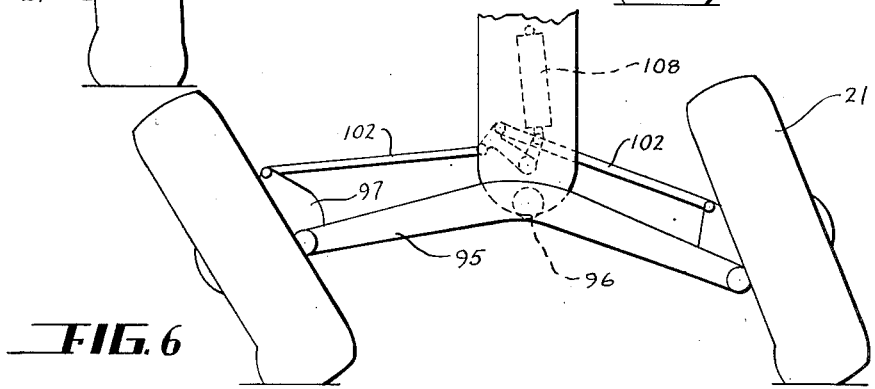
Figure 7:
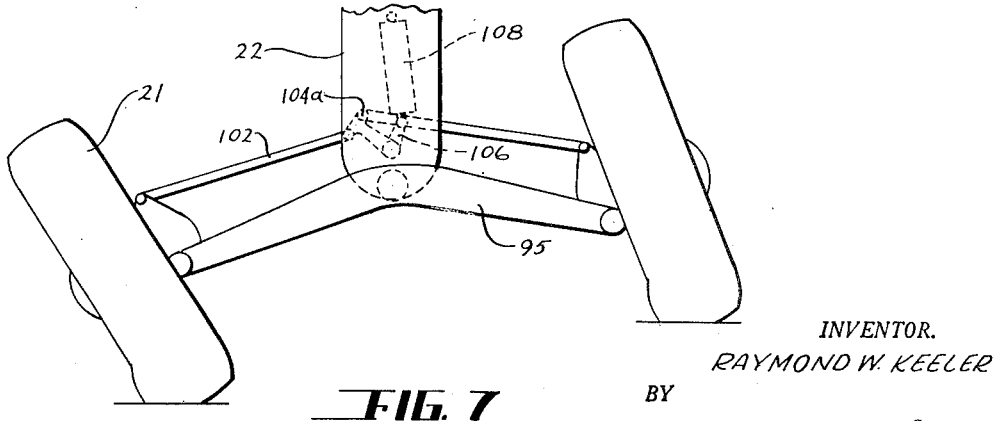

Means are provided for actuating the crank arm 104 to move the wheels about the axes of the wheel supporting members to the desired inclination and for retaining them in the positions to which they have been adjusted. In the particular arrangement here shown a second crank shaft 106 is rigidly connected with the crank arm 104, as by rigidly securing it to the shaft 105, and the outer end of this second crank arm is pivotally connected with the outer end of the piston rod 107 of a substantially vertical reciprocatory hydraulic motor 108. The motor 108 is here shown as pivotally supported at its upper end on the frame, at 109. This motor is connected with a suitable source of fluid supply and the operation thereof is controlled by a controlling device 32 at the operator's station and may be one of a plurality of controlling devices mounted adjacent that station. Thus the operator can at any time during the operation of the machine positively move the steering wheels to inclined positions with relation to the vertical plane of the main frame and maintain the same in those positions, the wheels at all times being in true, or substantially true, parrallelism one with the other regardless of the degree of inclination or the relatively vertical positions of the two wheels. In Fig. 4 the steering wheels are shown in their normal vertical positions and are supported at the same height, that is, resting on level ground. In Fig. 5 the wheels are supported at substantially different heights but are still maintained in parallelism one with the other. In Fig. 6 the wheels are supported at the same height but are inclined sharply to the road surface on which they rest and are in true parallelism one with the other. In Fig. 7 the wheels are at the same inclination as shown in Fig. 6 but have been moved to different heights without destroying the parallelism thereof.

While I have shown and described one embodiment of my invention, I wish it to be understood that I do not desire to be limited to the details thereof as various modifications may occur to a person skilled in the art.

Having now fully shown and described my invention, what I claim as new and desire to secure by Letters Patent, is:

In a road grader, a frame extending lengthwise of the grader and having a downwardly extending forward end portion rigid therewith, an axle mounted between the ends thereof on said end portion of said frame for movement about an axis extending lengthwise of said frame and held against movement about a vertical axis, a pair of horizontally disposed pivot pins, one for each end of the axle, a pair of wheel supporting hangers pivotally mounted on said pins, there being one hanger at each end of the axle, said pins extending parallel to the pivotal axis of the axle, said hangers extending upwardly from the pins, each hanger being provided with outwardly extending parts, a pair of king pins fixedly attached to the outwardly extending parts, there being one king pin fixedly attached to one of the hangers and the other king pin fixedly attached to the other hanger, a pair of substantially horizontally disposed spindles pivotally mounted to the king pins, there being one spindle for each king pin, wheels rotatably mounted on the spindles for supporting the axle, a steering rod extending parallel to the axle for interconnecting the spindles for steering the wheels about the king pins, an actuating member pivotally mounted on said end portion of said frame for movement about a horizontal axis transverse to the axle, a pair of elongate members pivotally connected with said actuating member and extending lengthwise of the respective end portions of said axle, means for connecting the outer ends of said elongate members with the respective hangers at points spaced from the horizontal axis of said hangers, and a device mounted on said frame and operatively connected with said actuating member to move said hangers about their horizontal pivotal connections with said axle to adjust the vertical angular relation of the wheels with respect to the axle.

RAYMOND W. KEELER.

REFERENCES CITED

The following references are of record in the file of this patent:

UNITED STATES PATENTS

| Number | Name | Date |
|---|---|---|
| 1,927,679 | Brick | Sept. 19, 1933 |
| 2,162,360 | Shaeffer | June 13, 1939 |
| 2,247,345 | Arndt | July 1, 1941 |

FOREIGN PATENTS

| Number | Country | Date |
|---|---|---|
| 315,507 | Great Britain | July 18, 1929 |